(12) United States Patent
Kerins et al.

(10) Patent No.: US 10,319,259 B2
(45) Date of Patent: Jun. 11, 2019

(54) ANATOMICAL SIMULATORS PRODUCED USING 3D PRINTING

(71) Applicants: Fergal Kerins, Toronto (CA); Gregory Allan Whitton, Toronto (CA); Joshua Lee Richmond, Toronto (CA); Timotheus Anton Gmeiner, Toronto (CA)

(72) Inventors: Fergal Kerins, Toronto (CA); Gregory Allan Whitton, Toronto (CA); Joshua Lee Richmond, Toronto (CA); Timotheus Anton Gmeiner, Toronto (CA)

(73) Assignee: SYNAPTIVE MEDICAL (BARBADOS) INC., Bridgetown (BB)

( * ) Notice: Subject to any disclaimer, the term of this patent is extended or adjusted under 35 U.S.C. 154(b) by 137 days.

(21) Appl. No.: 15/324,074

(22) PCT Filed: Sep. 23, 2015

(86) PCT No.: PCT/CA2015/050943
§ 371 (c)(1),
(2) Date: Jan. 5, 2017

(87) PCT Pub. No.: WO2017/049380
PCT Pub. Date: Mar. 30, 2017

(65) Prior Publication Data
US 2017/0291359 A1    Oct. 12, 2017

(51) Int. Cl.
*G09B 23/30* (2006.01)
*B33Y 80/00* (2015.01)
(Continued)

(52) U.S. Cl.
CPC ........ *G09B 23/303* (2013.01); *B29C 35/0805* (2013.01); *B29C 37/0025* (2013.01);
(Continued)

(58) Field of Classification Search
CPC .. G09B 23/30; G09B 23/303; B29C 35/0805; B29C 2035/0827; B29C 67/0059;
(Continued)

(56) References Cited

U.S. PATENT DOCUMENTS

| 6,083,008 A | 7/2000 | Yamada et al. |
| 2010/0047752 A1* | 2/2010 | Chan ................... B29C 33/3857 434/272 |

(Continued)

FOREIGN PATENT DOCUMENTS

WO    201376056    5/2013

OTHER PUBLICATIONS

Pan et al. (Biomaterial characteristics and application of silicone rubber and PVA hydrogels mimicked in organ groups for prostate brachytherapy, Elsevier, May 2015, p. 220). (Year: 2015).*

(Continued)

*Primary Examiner* — Robert C Dye
*Assistant Examiner* — Sedef E Paquette

(57) ABSTRACT

Disclosed herein are anatomical simulators produced using three dimensional (3D) printing to produce interior components of the simulator. The method of producing void structures in an anatomical phantom, includes 3D printing one or more structures of one or more desired sub-anatomical features using a dissolvable material; supporting and enclosing the one or more structures in an interior of a mold of the anatomical phantom; filling a remaining internal volume in the interior of the mold between an outer surface of the one or more structures and an inner surface of the mold with a liquid precursor of a matrix material selected to mimic anatomical tissue and processing the liquid precursor to form a tissue mimic matrix material; and dissolving the one or more structures with a fluid selected to dissolve said dissolvable material to produce one or more internal cavities within the tissue mimic matrix material.

11 Claims, 9 Drawing Sheets

(51) Int. Cl.
  *B33Y 10/00* (2015.01)
  *B33Y 40/00* (2015.01)
  *B33Y 70/00* (2015.01)
  *B29C 35/08* (2006.01)
  *B29C 37/00* (2006.01)
  *B29C 64/112* (2017.01)
  *B29C 64/129* (2017.01)
  *B29K 83/00* (2006.01)
  *B29L 31/00* (2006.01)

(52) U.S. Cl.
  CPC .......... *B29C 64/112* (2017.08); *B29C 64/129* (2017.08); *B33Y 10/00* (2014.12); *B33Y 40/00* (2014.12); *B33Y 70/00* (2014.12); *B33Y 80/00* (2014.12); *G09B 23/30* (2013.01); *B29C 2035/0827* (2013.01); *B29K 2083/00* (2013.01); *B29K 2995/0037* (2013.01); *B29L 2031/7532* (2013.01)

(58) Field of Classification Search
  CPC ... B29C 67/007; B29C 37/0025; B29C 64/10; B33Y 80/00; B33Y 70/00; B33Y 40/00; B33Y 10/00; B29K 2083/00; B29K 2995/0037; B29L 2031/7532
  USPC ........ 264/482, 494; 434/262, 267, 270, 272; 156/264
  See application file for complete search history.

(56) References Cited

U.S. PATENT DOCUMENTS

2016/0148541 A1* 5/2016 Ristolainen ............ G09B 23/30
  434/268
2016/0332388 A1* 11/2016 Park ....................... B33Y 80/00

OTHER PUBLICATIONS

Culjat et al. (A Review of Tissue Substitutes for Ultrasound Imaging, Elsevier, Feb. 2010, pp. 865-866). (Year: 2010).*
Chen, Z., Gillies, G. T., Broaddus, W. C., Prabhu, S. S., Fillmore, H., Mitchell, R. M., . . . Fatouros, P. P. (2004). A realistic brain tissue phantom for intraparenchymal infusion studies. Journal of Neurosurgery, 101(2), 314-322. doi:10.3171/jns.2004.101.2.0314.
Jhaveri, S. J., Mcmullen, J. D., Sijbesma, R., Tan, L., Zipfel, W., & Ober, C. K. (2009). Direct Three-Dimensional Microfabrication of Hydrogels via Two-Photon Lithography in Aqueous Solution. Chemistry of Materials Chem. Mater., 21(10), 2003-2006. doi:10.1021/cm803174e.
Bhattacharjee, T., Zehnder, S. M., Rowe, K. G., Jain, S., Nixon, R. M., Sawyer, W. G., & Angelini, T. E. (2015). Writing in the granular gel medium. Science Advances, 1(8). doi:10.1126/sciadv.1500655.
International Search Report. PCT International Application No. PCT/CA2015/050943 dated May 30, 2016.
Written Opinion, PCT International Application No. PCT/CA2015/050943 dated May 30, 2016.
Ostendorf et al., "Two-Photon Polymerization: A New Approach to Micromachining", Photonics Spectra, 40(10):72-80 • Sep. 2006.

* cited by examiner

ANATOMICAL SIMULATORS PRODUCED USING 3D PRINTING

FIELD

The present disclosure relates to anatomical phantoms produced using three dimensional (3D) printing, and more particularly it relates to cerebrospinal diffusion phantoms produced using 3D printing techniques.

BACKGROUND

In the field of medicine, phantoms or simulators are very useful. Certain sub-anatomical features present a development/manufacturing challenge. For example, brain ventricles are negative spaces within the brain that allow cerebral spinal fluid (CSF) to circulate and nourish the brain and provide protection against compression. A number of currently used methods to prepare these structures have challenges. One method of creating voids or negative spaces involves using balloons. The balloons are inflated within a liquid hydrogel which is then cooled. After a freeze-thaw cycle (FTC), the balloon is removed from the hydrogel. This remove leaves a scar on the surface and may require post-processing such as back-filling with water and removal of air pockets that develop.

SUMMARY

The present disclosure discloses embodiments of methods of incorporating negative (fluid-filled) spaces as sub-anatomy features in anatomical simulators/phantoms and utilizes printing 3D structures using materials which can be dissolved once the simulator has been produced. In an embodiment the method involves a number of steps including 3D printing of the negative space required (e.g. brain ventricles with a dissolvable material such as a PVA filament) to produce a printed 3D volume, followed by placement of the printed 3D volume within a mold of an anatomical part. A polyvinyl alcohol (PVA) formulation is then poured into the mould to surround and encapsulate an appropriate number of freeze thaw cycles (FTC) are carried out to produce a tissue phantom with the desired biomechanical properties. The printed 3D volume is then dissolved to produce a fluid filled void having the size and shape of the printed 3D volume.

The filament material used to print the 3D volume selected based on the ability of the resulting 3D volume to maintain its integrity for the course of the FTCs and be able to be dissolved completely leaving a fluid in the negative space. This can be achieved by either choosing a filament material with desirable properties or printing the 3D volume and applying a protective layer of a water resistant material to extend its life until the FTC is complete.

In an embodiment in which the anatomical phantom/simulator is mimicking the brain, to produce the ventricles and cerebral spinal fluid (CSF), the PVA filament can be printed with wall thicknesses to create a final solution of a targeted viscosity. This approach can be used to ensure that the rate of equalization of concentrations of various materials (e.g. PVA and water) is slowed so as to not cause a change in shape in the structure or impinge on the shelf/usable life of the product. Additional materials may also be added beforehand to help retain water in the spaces (such as cornstarch).

Other embodiments could include using alternative filaments such as high impact polystyrene (HIPS) that require another agent such as limonene to dissolve. In addition salt, sugar, sand, silicone may be used.

In a non-limiting embodiment, vascularity may be printed using a red plastic at high resolution with PVA filament as scaffold and placed in a silicone mold and immersed in the hydrogel formulation and a simulator produced by the usual method. The solution would dissolve the scaffold and form a cryogel supporting the printed structure.

An embodiment of a method of producing void structures in an anatomical phantom, comprises:

3D printing one or more structures of one or more desired sub-anatomical features using a dissolvable material;

supporting and enclosing the one or more structures in an interior of a mold of the anatomical phantom;

filling a remaining internal volume in the interior of the mold between an outer surface of the one or more structures and an inner surface of the mold with a liquid precursor of a matrix material selected to mimic anatomical tissue and processing said liquid precursor to form a tissue mimic matrix material; and dissolving the one or more structures with a fluid selected to dissolve said dissolvable material to produce one or more internal cavities within the tissue mimic matrix material.

Another embodiment of a method of producing void structures in an anatomical phantom, comprises:

a) printing, using 3D printing with silicone, one or more hollow structures of one or more desired sub-anatomical features, connecting the one or more hollow structures to a proximal end of an associated fluid flow channel;

b) supporting and enclosing the one or more hollow structures and associated fluid flow channel in an interior of a mold of the anatomical phantom with a distal end of the associated fluid flow channel being located on an exterior of the mold;

c) filling a remaining internal volume in the interior of the mold between an outer surface of both the one or more hollow structures and the associated vasculature and an inner surface of the mold with a liquid precursor of a matrix material selected to mimic anatomical tissue, the liquid precursor including at least polyvinyl alcohol, and curing the polyvinyl alcohol to produce a polyvinyl alcohol-based hydrogel to form a tissue mimic matrix material; and d) filling, through the access port, the one or more one hollow structures and their associated vasculature with liquid solutions selected to mimic preselected bodily fluids.

A further understanding of the functional and advantageous aspects of the invention can be realized by reference to the following detailed description and drawings.

BRIEF DESCRIPTION OF THE DRAWINGS

Embodiments disclosed herein will be more fully understood from the following detailed description thereof taken in connection with the accompanying drawings, which form a part of this application, and in which.

DETAILED DESCRIPTION

Figure 1:
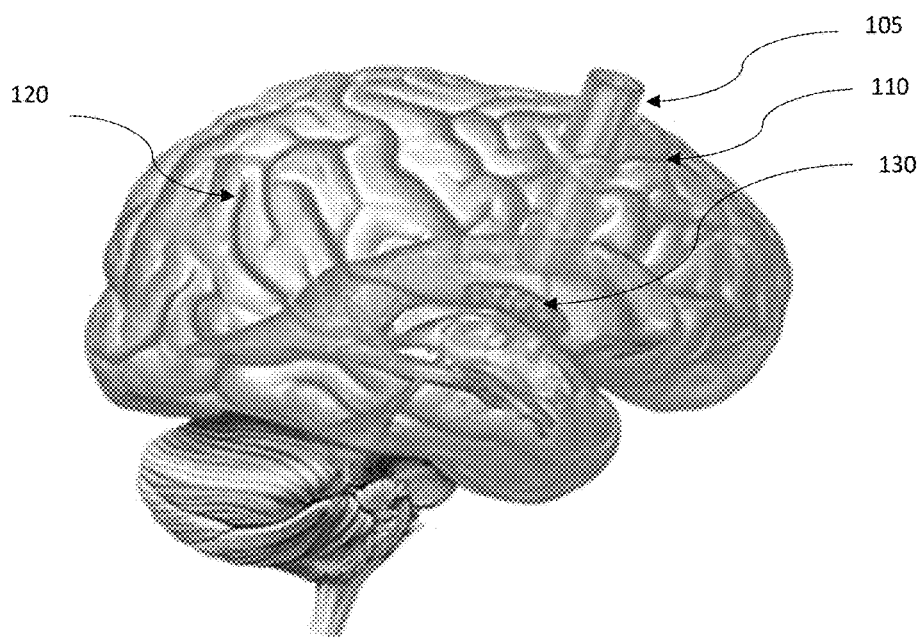
FIG. 1 is an illustration of an example port-based surgical approach. A port is inserted along the sulci to approach a tumor located deep in the brain.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions.

As used herein, the term "patient" is not limited to human patients and may mean any organism to be treated using the planning and navigation system disclosed herein.

As used herein, "hydrogels" refer to materials that are formed by crosslinking polymer chains, through physical, ionic or covalent interactions and are known for their ability to absorb water. An example of a physical interaction that can give rise to a hydrogel is by thermal treatment of the liquid hydrogel precursor which, prior to being subjected to a freeze thaw cycle is a liquid or near liquid. The process of freezing the liquid precursor acts to freeze the water contained in the polymer/water mixture and ice particles causes the polymer strands to be topologically restricted in molecular motion by other chains thus giving rise to the "entanglement' cross linking to produce the hydrogel. Hydrogels that have been produced by a freeze that cycle are sometimes referred to as "cryogels".

Hydrogels characterized by cross linking that are produced through ionic or covalent interactions typically require a cross linking (XL) agent and/or an initiator and activation by methods such as heat or radiation.

The present disclosure provides methods for producing organ structures for embedding in anatomical simulators/phantoms which involves creating negative spaces within the simulator housing, e.g. printing structures with PVA or HIPS filament material and dissolving the structures post simulator production with water or limonene respectively to leave a negative space that corresponds to a ventricle or other void feature of the anatomical part.

In an embodiment, PVA printed structures may be used to create a cystic tumor defined by a high-cellularity boundary and containing a low-cellularity inner domain. In an embodiment, a water soluble raft or scaffold structure can be used to orientate and support a non-soluble structure such as a vascular model so that when a cryogel sets around this structure the rafting dissolves leaving the non-soluble model encapsulated and supported by the cryogel. In addition, the printed 3D structures can be coated with a thin varnish or membrane structure to simulate a pial boundary. As well as creating negative spaces, a printed 3D structure can be fabricated so that it 'softens' instead of dissolves to create a sub-anatomical feature with high precision and predictable haptic properties.

When performing surgical and/or diagnostic procedures that involve the brain, neurosurgical techniques such as a craniotomy, or a minimally invasive procedure such as an endo-nasal surgery or a port based surgical method, may be performed to provide access to the brain. In such procedures, as indicated, the medical procedure is invasive of the mammalian head. For example, in the port-based surgical method illustrated in FIG. 1, a port 105 is inserted along the sulci 110 of the brain 120 to access a tumor 130 located deep in the brain.

According to embodiments provided herein, the simulation of such procedures may be achieved by providing a brain model that is suitable for simulating the surgical procedure through one or more layers of the head. Such a procedure may involve perforating, drilling, boring, punching, piercing, or any other suitable methods, as necessary for an endo-nasal, port-based, or traditional craniotomy approach. For example, some embodiments of the present disclosure provide brain models comprising an artificial skull layer that is suitable for simulating the process of penetrating a mammalian skull. As described in further detail below, once the skull layer is penetrated, the medical procedure to be simulated using the training model may include further steps in the diagnosis and/or treatment of various medical conditions. Such conditions may involve normally occurring structures, aberrant or anomalous structures, and/or anatomical features underlying the skull and possibly embedded within the brain material.

In some example embodiments, the brain model is suitable for simulating a medical procedure involving a brain tumor that has been selected for resection. In such an example embodiment, the brain model is comprised of a brain material having a simulated brain tumor provided therein. This brain material simulates, mimics, or imitates at least a portion of the brain at which the medical procedure is directed or focused.

The simulation of the above described medical procedure is achieved through simulation of both the surgical procedure and the associated imaging steps that are performed prior to surgery (pre-operative imaging) and during surgery (intra-operative imaging). Pre-operative imaging simulation is used to train surgical teams on co-registration of images obtained through more than one imaging methodology such as MR, CT and PET. Appropriate co-registration geometrically aligns images from different modalities and, hence, aids in surgical planning step where affected regions in the human body are identified and suitable route to access the affected region is selected. Another use of pre-operative imaging is to train the surgical team and radiologists on optimizing the imaging parameters so that clinically relevant images are acquired prior to the surgical procedure. For example, pre-operative MR images need to be acquired in a specific manner to ensure that the acquired data can be used to generate tractography information, such as Diffusion Tensor Imaging (DTI), which shows the location and direction of the brain tracks which are not visually observable by the surgeon. Intra-operative imaging is used to guide the surgeon through accurate surgical intervention while avoiding damaging the brain tracks if possible. Surgical intervention includes accessing a previously identified affected region in the human body and subsequent resection of affected tissue.

Referring to FIGS. 2-5, an exploded view of an example model or phantom shown generally at 100 is provided that is suitable for use in training or simulation of a medical procedure which is invasive of a mammalian head. The training model 100 may be adapted or designed to simulate any mammalian head or a portion thereof. It is to be understood that the person to be trained may be selected from a wide variety of roles, including, but not limited to, a medical doctor, resident, student, researcher, equipment technician, or other practitioner, professionals, or personnel. In other embodiments, the models provided herein may be employed in simulations involving the use of automated equipment, such as robotic surgical and/or diagnostic systems.

Figure 2:
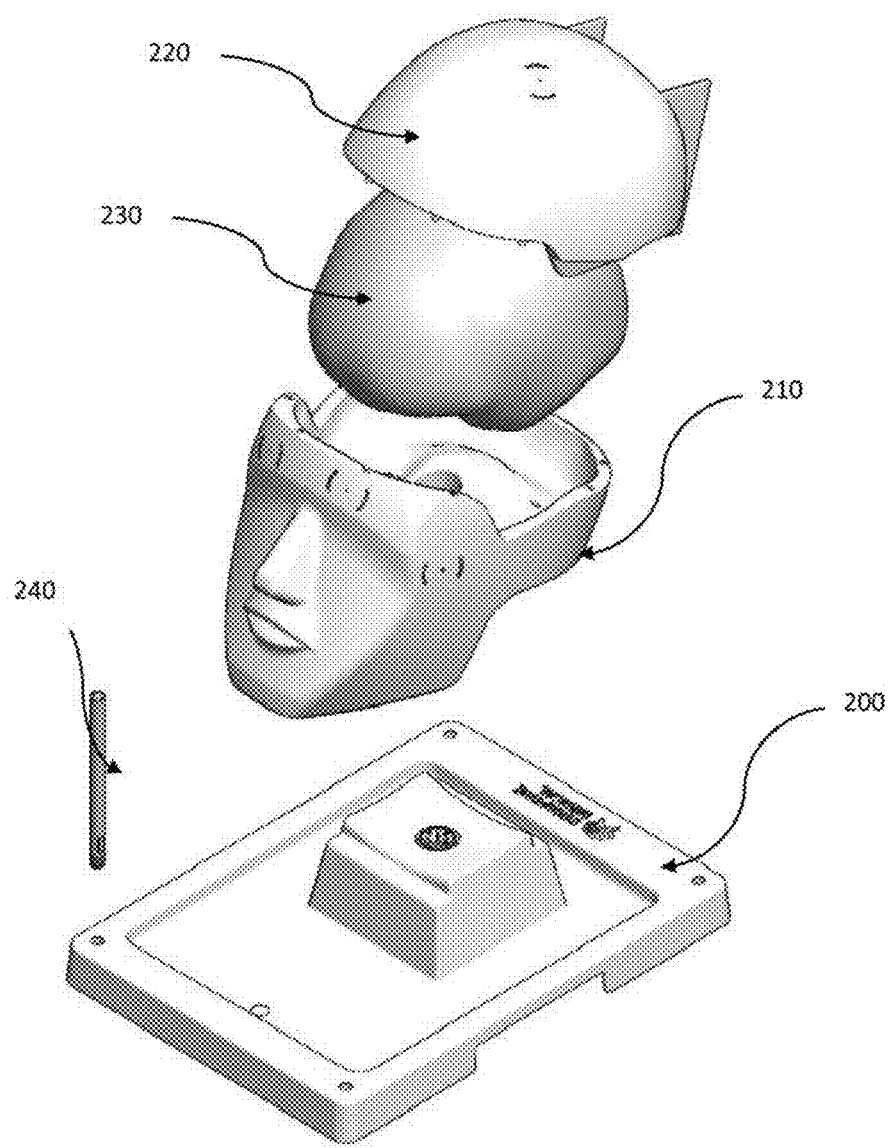
FIG. 2 is an illustration of an example training model in an exploded view, illustrating parts of the base component and the training component.

Referring now to FIG. 2, an exploded view of an example implementation of training model 100 is shown that includes a base component and a training component. The base component is comprised of a tray component 200 and a head component. The head component is comprised of a bowl component 210 and a skull component 220. The training component may be comprised of a brain 230 with the following layers: dura, CSF (cerebrospinal fluid), vessels, white matter, grey matter, fiber bundles or tracks, target tumors, or other anomalous structures. The training component may also include the aforementioned skull component 220 when crafted in a skull mimicking material. Optionally, the training model 100 may be also comprised of a covering skin layer (not shown). Further, the base component may include a holder 240 provided on the tray 200 to facilitate easy mounting of fiducials or reference points for navigation.

Figure 3:
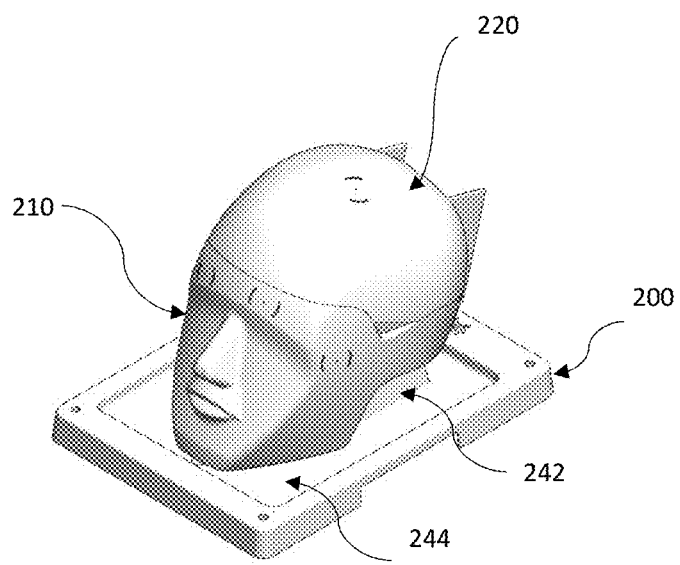
FIG. 3 is an illustration of an example base component of the training model illustrating the tray, the head and the skull assembled together.
Figure 4:
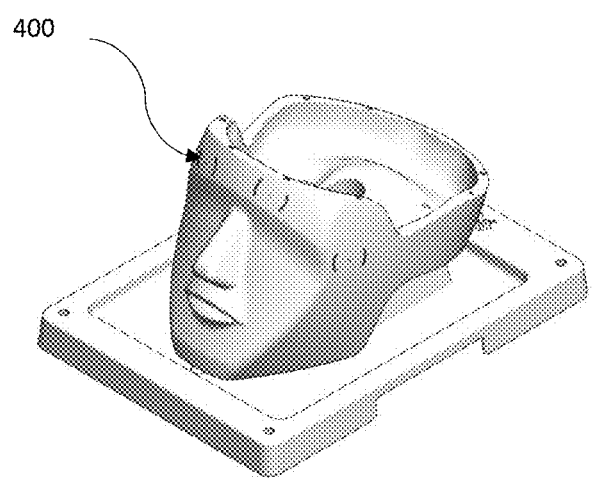
FIG. 4 is an illustration of an example base component of the training model without the skull section, illustrating fiducials that are important for registration of images acquired using different modalities.
Figure 5:
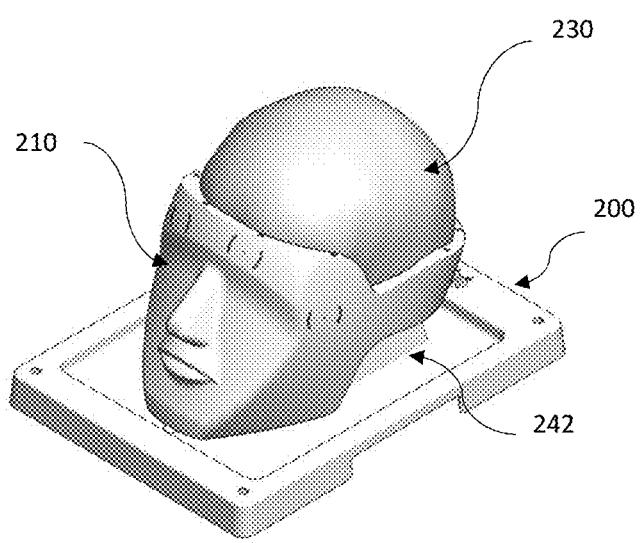
FIG. 5 is an illustration of an example base component of the training model, shown containing the brain training component.

Referring to FIGS. 3 to 5, the tray component 200 forming part of the base component defines a training receptacle which includes a pedestal section 242 which is sized and configured for receipt of the bowl component 210 therein. Thus the training component is sized, configured or otherwise adapted to be compatible with, or complementary to the base component, and particularly the training component receptacle, such that the base component and the training component may be assembled to provide the assembled training model 100.

The base component may have any size, shape and configuration capable of maintaining the training component, mounted within the training component receptacle, in a position suitable for performing the medical procedure to be trained. This base component comprises features that enable registration, such as fiducials, touchpoint locations, and facial contours for 3D surface scanning, MR, CT, OCT, US, PET, optical registration or facial registration. Furthermore, the base component is adapted or configured to maintain the training component in a relatively stable or fixed position throughout the performance of the medical procedure to be simulated during the training procedure. The base component provides both mechanical support during the training procedure and aids in the proper orientation of the training components to mimic actual positioning of a patient's head during the surgical procedure.

Referring to FIGS. 2 and 3, as noted above, the base component may be comprised of a head component 210 and a tray component 200. The tray component 200 is sized, configured or otherwise adapted to be compatible with, or complementary to the head component 210. The tray component 200 is adapted or configured to maintain the head component 210 in a relatively stable or fixed position throughout the performance of the imaging or medical procedure to be simulated. This may be accomplished with the use of a mechanical feature such as a snap mechanism that exists to affix the head component 210 to the tray component 200. The tray component 200 may contain a trough 244 to catch liquids, and insertion points to affix hardware to aid with image registration and/or the medical procedure to be trained.

The head component 210 is sized, configured or otherwise adapted to be compatible with, or complementary to the tray component 200 and the training component. The head component 210 is adapted or configured to maintain the training component 230 (located under skull component 220 in a relatively stable or fixed position throughout the performance of the medical procedure to be simulated. This head component 210 is adapted or configured to enable anatomically correct surgical positioning. This may include affixing the head component 210 with a surgical skull clamp or headrest, for example a Mayfield skull clamp. This head component 210 is also adapted or configured to enable anatomically correct imaging positioning for any contemplated imaging modality including, but not limited to, MR, CT, OCT, US, PET, optical registration or facial registration. For example the head component 210 may be positioned in a supine position within an MRI apparatus to enable anatomically accurate coronal image acquisition.

In some embodiments, the head component 210 is shaped or configured to simulate a complete or full skull. In other words, the training component comprises bowl section 210 and skull section 220, while the bowl section 210 comprises a further portion of a complete skull and head. In some embodiments, as shown in FIG. 2, the head component i.e., bowl section 210 and skull section 220, and training component 230 together provide a complete simulated skull or together provide a simulated head including skull 220 and brain 230. The simulated head provided by the training model 100 enhances the reality of the overall simulation training experience.

In addition, the base and training components of the training model 100, and particularly the head component, may also include one or more external anatomic landmarks or fiducial locations 400, as shown in FIG. 4, such as those likely to be relied upon by the medical practitioner for image registration for example, touchpoints, the orbital surface, nasal bone, middle nasal concha, inferior nasal concha, occipital bone, nape, and nasal passage. These features will aid in registering the training component with the preoperative images, such as MR, CT, OCT, US, PET, so that the surgical tools can be navigated appropriately.

In this regard, navigation to establish the location of the hole or passage through the skull of the patient during the craniotomy procedure is often critical for the success of the medical procedure. Accordingly, external anatomic landmarks and/or touchpoints are provided by the simulated head in order to provide training on the correct registration of the training model with the acquired images. These anatomic landmarks and touchpoints may be utilized for attaching registration hardware, for example a facial registration mask or fiducial landmark. Thus, the training model, and particularly the simulated head, are sized, configured and shaped to approximate and closely resemble the size, configuration and shape of the head of a patient on which the medical procedure is to be performed. In other words, the head component may be both 'life-like' and 'life-sized'.

The base component may be comprised of any composition or material suitable for providing the training component receptacle, and may be suitable for being cast, molded or otherwise configured to provide or support the simulated head when assembled with the training component. For instance, the base component may be comprised of any suitable casting compound, casting composition or plaster. The base component may be comprised of a material that is rigid, non-reflective, non-ferrous, non-porous, cleanable, and lightweight, for example a urethane or acrylonitrile butadiene styrene (ABS). In addition, the bowl 210 and skull 220 components of the base component may be comprised of a material that is visible by the imaging procedure of interest to enable registration. The material for the bowl 210 and skull 220 components of the base may therefore be selected to be visible by MR, CT, and/or PET.

As shown in FIG. 5, the training component 230 and the base component 210 are complementary or compatible such that when the training component 230 is mounted on the pedestal 242 in the training component receptacle in tray 200, together they provide the training model. Furthermore, the configuration and dimensions of the training component 230 and the base component 210 are complimentary or compatible such that the training component 230 may be received and fixedly or releasably mounted in the base component 210.

In some embodiments, in order to permit the replacement or substitution of the training component 230, the training component is detachably or releasably mounted in the base component 210. Any detachable or releasable fastener or fastening mechanism may be used which is capable of securing the training component 230 in the receptacle, while also permitting the training component 230 to be readily detached, released or removed as desired or required. In one embodiment, the training component 230 is releasably or detachably mounted within the base component 210, specifically the training component 230 is held within the base component 210 to emulate the mechanical fixation of the brain in the skull.

Thus, in the present example embodiment, the training component 230 may be removed from the base component 210 and replaced with an alternate, replacement or substitute training component as desired or required by the user of the training model. For instance, a replacement training component 230 may be required where the previous training component 230 is damaged or modified during the training of the procedure. An alternate training component 230 may be adapted or designed for use in the training of the performance of a specific medical procedure or condition of the patient, allowing for the reuse of the base component 210.

Alternatively, as indicated, the training model 100 may not include the base component 210. In this instance, the other components comprising the training model 100, such as the training component 230 in isolation, may be supported directly by a supporting structure or a support mechanism (not shown) that does not look like a mammalian head. Specifically, the supporting structure may securely maintain the training component 230, without the other components of the training model, in the desired orientation. In such an embodiment, the training component 230 may be releasably attached or fastened with the supporting structure such that the training component 230 may be removed from the supporting structure and replaced with an alternate, replacement or substitute training component 230 as desired or required by the user of the training model.

Figure 6:
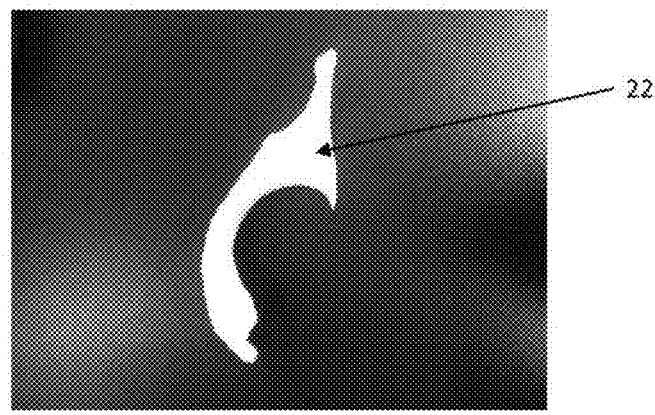
FIG. 6 is an elevation view of an embodiment of a printed 3D human ventricle.
Figure 7:
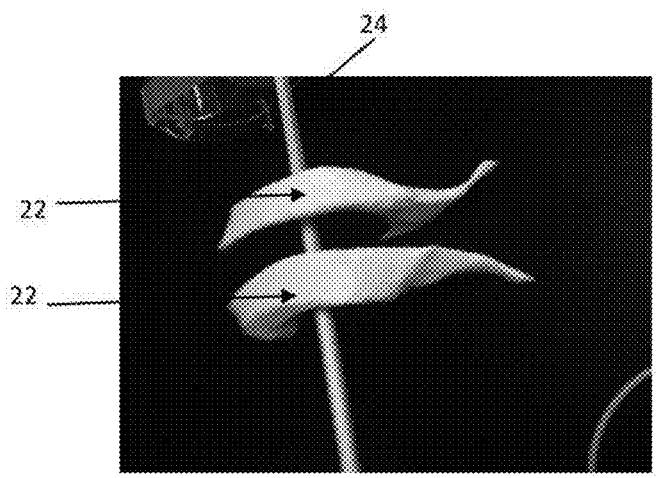
FIG. 7 is perspective view of two human ventricles supported on a support rod.
Figure 8:
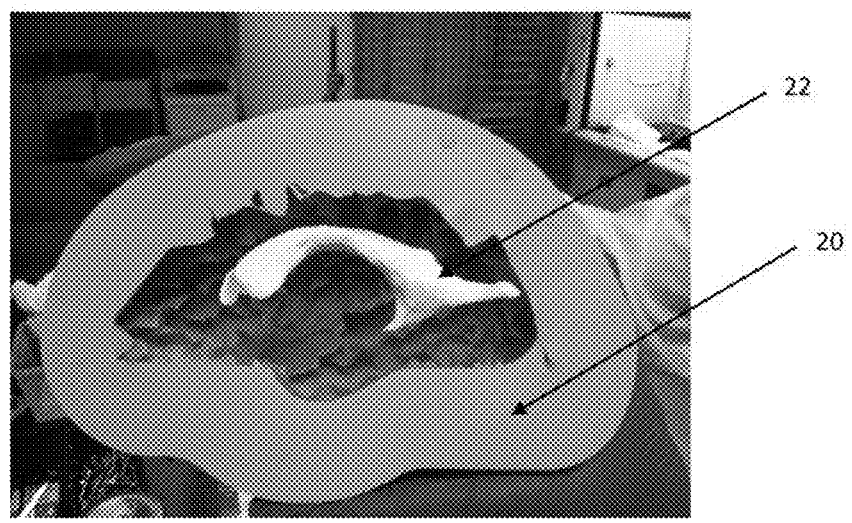
FIG. 8 is a view of the ventricle of FIG. 6 supported in one half of a cerebrospinal simulator.

Referring to FIG. 6, there is shown an elevation view of a printed 3D volume printed in the shape and size of a human ventricle 22. FIG. 7 shows a perspective view of two such ventricles 22 supported on a support member 24. FIG. 8 shows one half of a human brain simulator mold 20 with one of the printed ventricles 22 supported in the simulator half. Once the one or more ventricles 22 are supported, the two halves of the simulator are joined and sealed together and then filled with a matrix material used to mimic brain tissue. The process of manufacturing simulator 20 if further explained in international application PCT/CA2014/050975 entitled "PHANTOM PRODUCTION TOOL" which is incorporated by reference herein for the purposes of the US.

In an embodiment, the assembled brain simulator may be filed with a matrix material which is chosen to be magnetic resonance (MR) compatible and give MR signals including signals in the range of human tissue. The matrix material can be a polyvinyl alcohol (PVA) cryogel that is subjected to freeze thaw cycles, PVA solution, water, mineral oil or a solution of salt such as copper sulfate or similar materials. Exemplary formulations are disclosed in international application WO/2015/003271 entitled: "SURGICAL TRAINING AND IMAGING BRAIN PHANTOM", corresponding to US Patent Publication US2017291359, which is incorporated herein by reference in its entirety for the purposes of the United States. Once assembled and the brain tissue mimic material established, the 3D ventricle volumes are then dissolved leaving a fluid filled void having the size and shape of the human brain ventricles.

Figure 9:
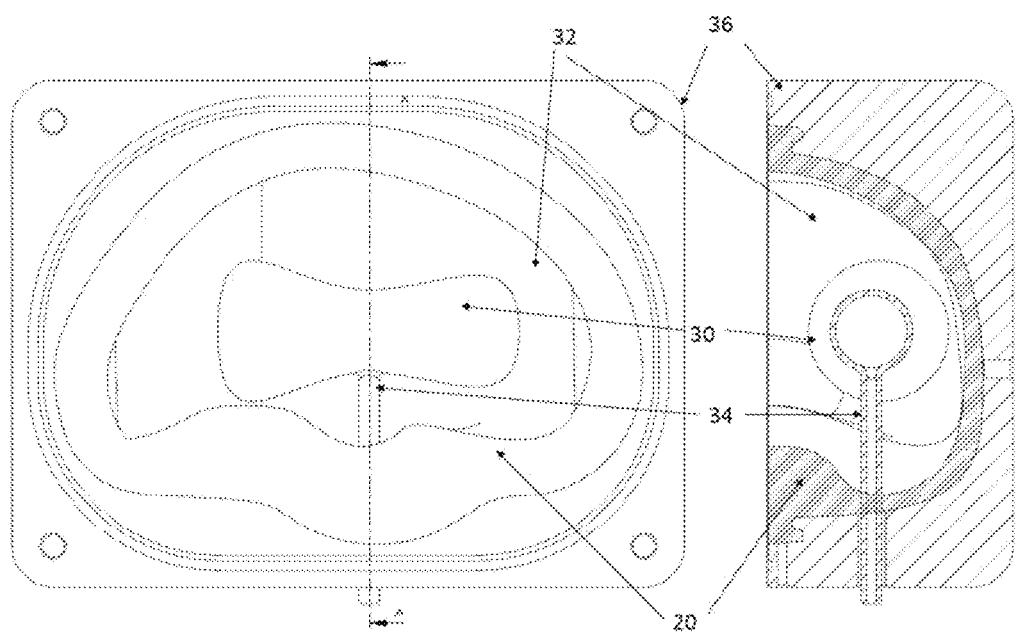
FIG. 9 is a cross-section view of a subanatomical element within a cerebrospinal simulator.

FIG. 9 is a cross-section view of a sub-anatomical element within a cerebrospinal simulator contained in a mold housing 36 used during the method of casting the simulator anatomical part, with mold 36 configured for producing a brain simulator. In FIG. 9, the negative (fluid-filled) space is generated through the use of silicone additive manufacturing technology. In this embodiment, sub-anatomical features of the body are constructed using micro-layers of silicone. Silicone is an elastomeric material that is effective as a tissue simulator. The silicone layers are built up by multitudes of silicone droplets that are UV cross-linked into an elastomeric material.

The left image of FIG. 9 shows silicon mold 20 housing a cavity or negative space 32. Suspended within the cavity 32 by a filling port 34 is a silicone sub-anatomical element 30. Sub-anatomical element 30 may be designed to mimic ventricles 22 as shown in FIGS. 6, 7 and 8.

The image on the right hand side of of FIG. 9 is a section view of section taken along line A-A on the image on the left hand side. This image is cross-hatched to show different materials. Mold casing 36 may be constructed of aluminum or other machined light alloys or it can also be laser sintered via additive manufacturing. Mold 20 is preferably made of silicone, however, other materials such as plastic or rubber which have similar ductility could also be used. Filling port 34 is also illustrated in detail here. Filling port 34 is preferably a cylindrical rod or straw that is additively manufactured (i.e., 3D-printed) via layering of ultra-violet (UV) cured silicone. Filling port 34 connects to sub-anatomical element 30 to enable filling of element 30 with various mediums at various stages of the production process (e.g. pre or post-FTC).

Figure 10:
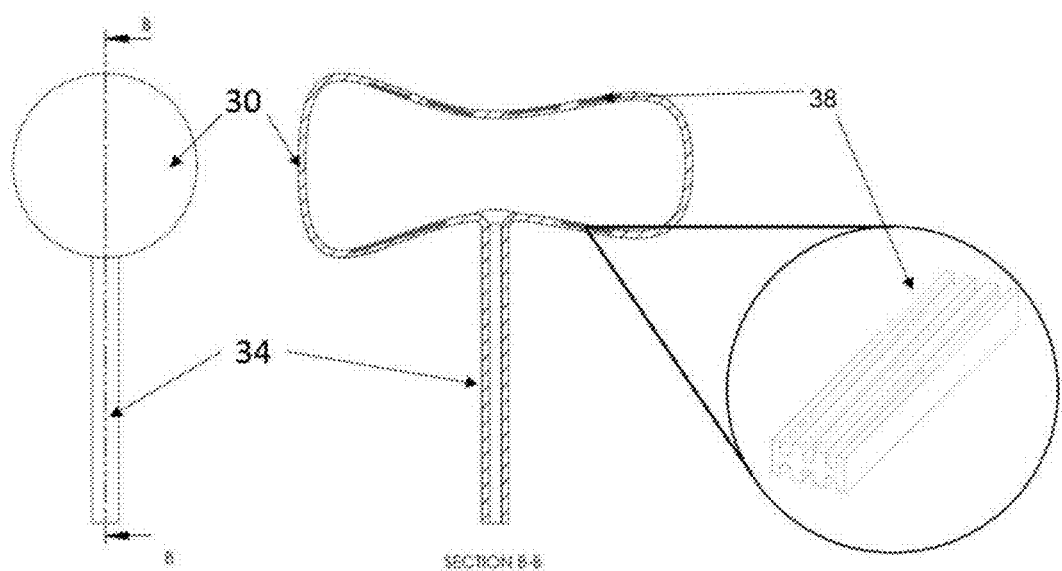
FIG. 10 is a cross-section view of a sub-anatomical element found in the cerebrospinal simulator of FIG. 9.

FIG. 10 is a cross-section view of a sub-anatomical element found in the cerebrospinal simulator of FIG. 9. The sub-anatomical element 30 is connected to filling port 34 and is designed to include internal cavities and feature wall thicknesses appropriate to simulate the tactile response of respective tissues to surgical instrumentation. These features are constructed with linked tubular structures that link the internal cavity structures (or network thereof) to the exterior of the mold. For example, in another embodiment, a sub-anatomical element 30 may be linked to other sub-anatomical elements (e.g ventricles 22 as seen in FIG. 8) via a tubular structure similar to the filling port 34 to enable filling with various liquids. As a further example, constructed feature in FIG. 10 can be used to create a simulator with a network of sub-anatomical structures which can be filled with a multitude of materials (e.g., hematoma structure filled with simulated blood clotting material connected to a vein structure filled with simulated blood).

In addition with regards to commonly found tumors in the brain such as GBMs there exist a multitude of materials that may be employed to mimic not only the tensile and tactile properties of the tumors but also their infusion properties. This may be useful when employed in a cerebro-spinal simulator in that it may facilitate the user to simulate infusion of various therapeutic agents directly into a tumor mimicking material allowing them to perform a mock procedure and potentially demonstrate results. Intraparenchymal drug and cell delivery using catheters is one potential example. An embodiment of a material that may mimic the infusion properties of the brain includes agarose gels of varying concentrations such as those described by the paper [Chen, Zhi-Jian, et al. "A realistic brain tissue phantom for intraparenchymal infusion studies." *Journal of neurosurgery* 101.2 (2004): 314-322.].

Furthermore, integrating the capability of variable-density printing within these networks of sub-anatomical features enables high resolution simulation of tissue structures. The is useful because biomaterials do not typically exhibit consistent densities, thus creating a simulation tool that exhibits variable densities or variable diffusive properties such as commonly used to mimic the fluidic diffusion properties of brain tissue such as grey matter or commonly found glioblastomas As an example, Wacker Chemie has created a new silicone 3D printing technology that would enable production of constructed featured of FIGS. 9 and 10.

In further embodiments (not shown), the use of bi-photon polymeration to create nano/micro scale structures can be considered. As an example, a silicone sub-anatomical structure can be 3D printed that includes cavities for filing with fluid. Other micro structures that may be 3D printed using the bi-photon polymerization may be embedded into the sub-anatomical structure. The other micro structures may also have micro groves appropriate for generating diffusion.

Halfway through printing of the silicone sub-anatomical structure, the 3D printing is paused, a plurality of bi-photon polymerized micro-structures 38 in FIG. 10 are inserted into the sub-anatomical structure. Then the silicone printing is completed. This process of inserting the bi-photon polymerized micro structures is repeated to create a pattern array of tractography within the scanned simulator that accurately depicts diffusion in the anatomical region of interest. Using this combined methodology, one can accurately simulate micro structures (e.g., axons) and macro structures (e.g., hematomas, ventricles) within the brain, vascularity, tumours, diseased white matter cartilage, bone, or neuro sub-anatomical structures.

The visibility of internal body structures in MRI is often improved through the use of contrast media, specifically, through the use of ultra-small superparamagnetic and paramagnetic particles. These particles work by shortening (in some cases increasing) the $T_1/T_2$ relaxation time of water protons via interactions with the particle. Thermally driven motion of the strongly paramagnetic metal ions in the contrast agent generate oscillating magnetic fields that provide the relaxation mechanisms that enhance the rate decay of the induce polarization.

In another embodiment, the additive manufacturing (3D-printing) of UV-cured silicone sub-anatomical structures may be supplemented through addition of superparamagnetic/paramagnetic nanoparticles into the UV-curable silicone. There are various nanoparticles that could be integrated into the silicone to generate this effect. Gadolinium (III) is often used for MR contrast enhancement of vessels in MR angiography or brain tumours. Iron oxide, manganese are used as well. Novel carbon nanohybrids (graphene oxide/metallofullerenes) have also been successfully utilized as efficient MRI contrast agents and are an improvement to Gadolinium due to there reduced toxicity, (see Cui, R, et al. Novel carbon nanohybrids as highly efficient magnetic resonance imaging contrast agents. Nano Research 2015, 8 (4): 1259-1268.)

The paramagnetic nanomaterials would be mixed with the silicone in before UV-curing. The ratio of nanoparticles to silicone would fluctuate according to the biomaterial and/or disease state being mimicked. A person skilled in the art would be able to determine which particles and which concentrations are most appropriate for the biomaterial and/or disease state being mimicked.

Through combining the method explained in this embodiment with those previously described, a surgical simulator may be produced that includes various fluid-filled, sub-anatomical elements, each with MRI characteristics and tactile response characteristics that accurately mimic biological tissues at various states. This may include, but is not limited to, vascularity, tumours, cartilage, bone, and sub-anatomy of the brain.

Figure 11:
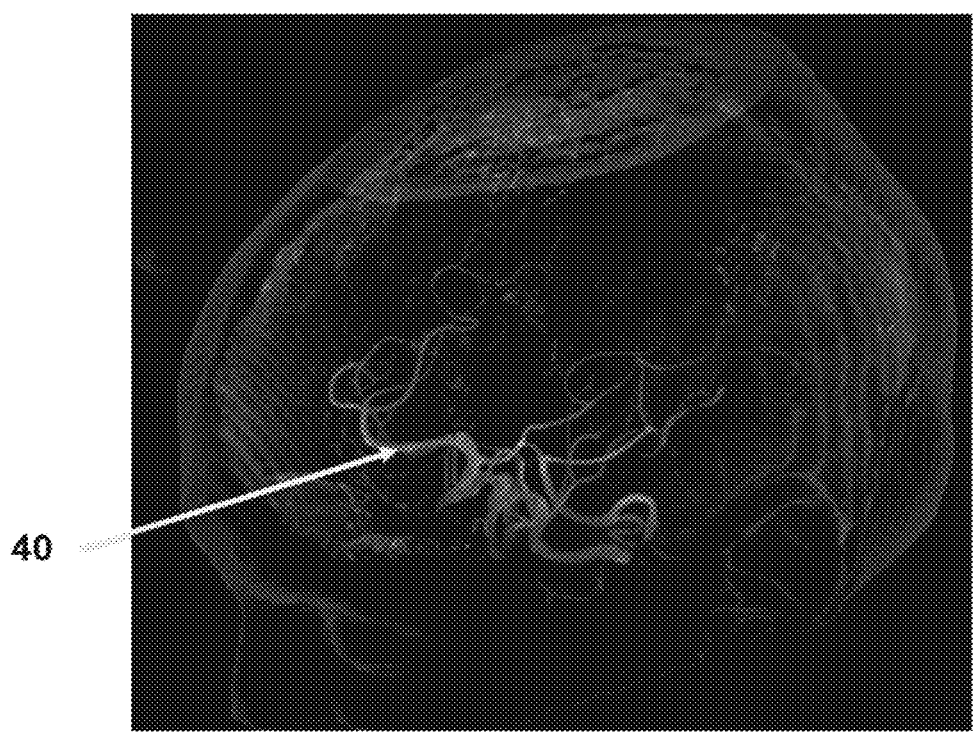
FIG. 11 illustrates anatomical vascularity that would be mimicked using the technique of paramagnetic nanoparticle-doped silicone to additively manufacture (3D-print) MRI contrast-controlled sub-anatomical elements.

FIG. 11 illustrates the anatomical vascularity 40 that would be mimicked using the technique of paramagnetic nanoparticle-doped silicone to additively manufacture (3D-print) MRI contrast-controlled sub-anatomical elements. This embodiment would add an additional level of realism and therefore training utility to the simulator. Should a surgical trainee incise the silicone fluid-filled cavity with a blade it could 'bleed' simulated blood.

Incorporating this embodiment with the "SURGICAL TRAINING AND IMAGING BRAIN PHANTOM" disclosed in PCT WO 2015/003271 the product would enable surgical trainees to have a visual reference for anatomical regions of interest (e.g. fluid-filled vascularity) during their pre-operative trajectory planning as well as during navigation-guided surgical port cannulation, and tumour resection.

While the Applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without departing from the embodiments, the general scope of which is defined in the appended claims.

Except to the extent necessary or inherent in the processes themselves, no particular order to steps or stages of methods or processes described in this disclosure is intended or implied. In many cases the order of process steps may be varied without changing the purpose, effect, or import of the methods described.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method of producing void structures in an anatomical phantom, comprising:
    a) printing, using 3D printing with silicone, one or more hollow structures and associated vasculature of one or more desired sub-anatomical features, connecting the one or more hollow structures to a proximal end of an associated fluid flow channel;
    b) supporting and enclosing the one or more hollow structures and the associated fluid flow channel in an interior of a mold of the anatomical phantom with a distal end of the associated fluid flow channel being located on an exterior of the mold;
    c) filling a remaining internal volume in the interior of the mold between an outer surface of both the one or more hollow structures and associated vasculature and an inner surface of the mold with a liquid precursor of a matrix material selected to mimic anatomical tissue, the liquid precursor including at least polyvinyl alcohol, and curing the polyvinyl alcohol to produce a polyvinyl alcohol-based hydrogel to form a tissue mimic matrix material; and
    d) filling, through an access port, the one or more one hollow structures and their the associated vasculature and inner surface of the mold with liquid solutions selected to mimic preselected bodily fluids;
    e) producing one or more microstructure, using bi-photon polymerization, in one or more positions in a wall of the one or more hollow structures that restrict radial water diffusion in order to generate DTI tractography.

2. The method according to claim 1, wherein the associated fluid flow channel is configured to mimic the associated vasculature connected to the one or more hollow structures.

3. The method according to claim 1, wherein curing the polyvinyl alcohol includes subjecting the polyvinyl alcohol to a preselected number of freeze-thaw cycles.

4. The method according to claim 1 wherein the one or more microstructures is produced partway through the step of 3D printing of the one or more hollow structures such that the 3D printing is paused and then the one or more microstructures is produced in the one or more positions using bi-photon polymerization, after which the 3D printing is resumed to completion, wherein a pattern array of DTI tractography within the wall of the one or more hollow structures is produced which depicts diffusion in an anatomical region of interest.

5. The method according to claim 4 wherein the pattern array of DTI tractography is configured to simulate any one or combination of one or more microstructure within the anatomical region of interest.

6. The method according to claim 5 wherein the anatomical region of interest is a human brain.

7. The method according to claim 5 wherein the one or more microstructures is selected from a group consisting of axons, hematomas, ventricles, vascularity, tumours, diseased white matter cartilage, bone, or neuro sub-anatomical structures.

8. The method according to claim 1 wherein the 3D printing is paused substantially midway through the 3D printing of the one or more hollow structures such that the one or more microstructures is produced substantially in a middle of the wall of said one or more hollow structures.

9. The method according to claim 1 wherein any one or combination of paramagnetic and superparamagnetic nanoparticles are incorporated into the silicone to provide $T_1/T_2$ contrast manipulation.

10. The method according to claim 9 wherein the any one or combination of paramagnetic and superparamagnetic nanoparticles comprise any one or combination of gadolinium (III), iron oxide, and carbon nanohybrids.

11. The method according to claim 10 wherein the carbon nanohybrids are any one or combination of graphene oxide and metallofullerenes.

* * * * *